United States Patent [19]

Geyer

[11] Patent Number: 5,348,388
[45] Date of Patent: Sep. 20, 1994

[54] EXTRUSION APPARATUS FOR MIXING AND EXTRUDING THERMO-PLASTIC MATERIALS

[76] Inventor: Paul Geyer, 210 B. North Lindell Rd., Greensboro, N.C. 27403

[21] Appl. No.: 945,065

[22] Filed: Sep. 15, 1992

[51] Int. Cl.$^5$ .............................. B01F 7/08; B29B 7/42
[52] U.S. Cl. ........................................ 366/80; 366/82; 366/319; 425/208
[58] Field of Search ........................... 366/79–82, 366/88–90, 91, 318–319, 322–324; 425/205, 208, 209

[56] References Cited

U.S. PATENT DOCUMENTS

| | | |
|---|---|---|
| 2,744,287 | 5/1956 | Parshall et al. |
| 2,765,491 | 10/1956 | Magerkurth ............................ 366/80 |
| 3,375,549 | 4/1968 | Geyer . |
| 3,888,469 | 6/1975 | Geyer ............................ 425/208 X |
| 4,075,712 | 2/1978 | Geyer ............................ 366/80 X |
| 4,136,969 | 1/1979 | Meyer ............................ 366/88 |
| 4,253,771 | 3/1981 | Renk ............................ 366/318 X |
| 4,408,725 | 10/1983 | Wenger et al. ............................ 366/79 X |
| 4,408,887 | 10/1983 | Yamaoka ............................ 366/82 X |
| 4,859,069 | 8/1989 | Geyer ............................ 366/88 X |
| 4,872,761 | 10/1989 | Geyer ............................ 366/79 |
| 4,944,597 | 7/1990 | Geyer ............................ 366/79 |
| 5,129,729 | 7/1992 | Geyer ............................ 366/89 X |
| 5,217,303 | 6/1993 | Geyer ............................ 366/89 X |

FOREIGN PATENT DOCUMENTS 916255  1/1963  United Kingdom ................. 366/90

*Primary Examiner*—David A. Scherbel
*Assistant Examiner*—Charles Cooley
*Attorney, Agent, or Firm*—Dykema Gossett

[57] ABSTRACT

An extrusion apparatus or extruder for mixing and extruding of thermo-plastic and rubber like process materials has a rotor member rotatable within the bore of a barrel member. Interposed between the feed end and the discharge end, the rotor and barrel members are provided with one or more mixing stages, consisting of process material transfers, rotor to barrel, barrel to enlarged rotor, enlarged rotor to enlarged barrel, enlarged barrel to enlarged rotor, enlarged rotor to barrel and barrel to rotor. Each process material transfer has the rotor or barrel member provided with multiple grooves which communicate with co-acting receiving rotor or barrel member multiple grooves. Each revolution of the rotor transfers process material from each sending groove to all of the co-acting receiving grooves, an action which reduces the thickness of the transferred material in the ratio of one to ten. There are six process material transfers, the resulting division of process material can be in the order of 1 to 10; 10 to 100; 100 to 1,000; 1,000 to 10,000 and 10,000 to 100,000 and 100,000 to 1,000,000.

8 Claims, 5 Drawing Sheets

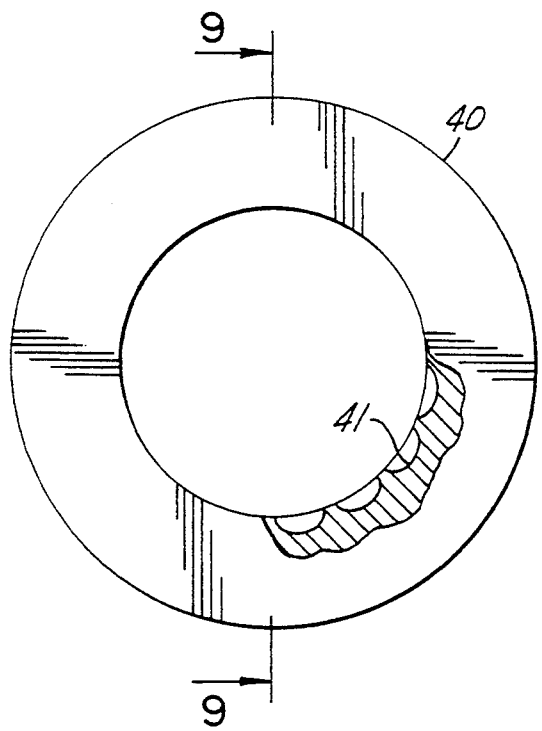
FIG.8
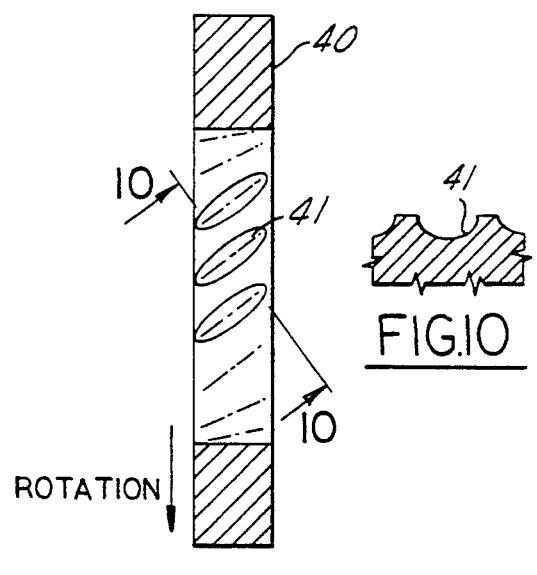
FIG.9
FIG.10
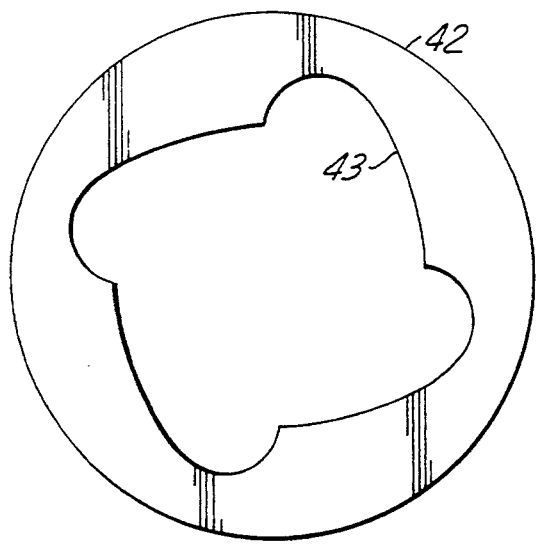
FIG.11
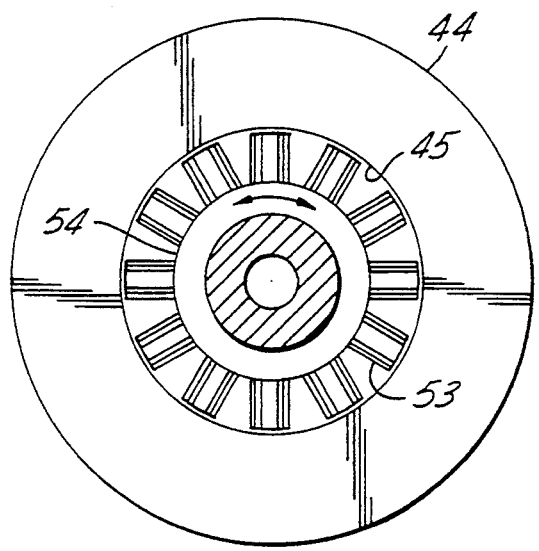
FIG.12

EXTRUSION APPARATUS FOR MIXING AND EXTRUDING THERMO-PLASTIC MATERIALS

This invention relates to an extrusion apparatus and particularly to an apparatus of the rotor and barrel type for the warming, mixing and extruding of thermo-plastic and rubber like materials.

BACKGROUND OF THE INVENTION

The first helical groove rotor in a barrel bore apparatus was probably used to grind meat, long before rubber was invented. The meat grinding operation wedges the process material against the barrel bore so as to cause the helical rotor groove to move the process material "enmasse" longitudinally down-stream.

The extrusion flow of the typical rubber processing extruder is quite different. Adhesion to the barrel bore and resistance to down-stream flow, causes the rubber to be moved circumferentially across the helical groove, from the leading edge to the trailing edge. The rubber arriving at the trailing edge must "push" its way downward and back across the helical groove to the leading edge. This action compresses the developed strain in the rubber and thereby is a source of non-productive work. In addition, the rubber flow pattern concentrates the mechanical shear at the barrel bore and extrusion groove surfaces and thereby tends to generate a warmed band of rubber surrounded by a cool core.

The "Pin Type" extruder, and other long extruders are actually extruders in series, separated by a dwell time section, long enough to blend the unequal temperature generated by the helical extrusion grooves. The extrusion therefore must be a blend of over-worked and under-worked process material.

The "Transfer Type" extruder which transfers the process material from rotor to barrel to rotor is the best of present day extruders. However, the transfer of process material from rotor to barrel tends to wind the warmed process material into a spiral roll in the receiving barrel groove. This roll, reaching the barrel to rotor transfer, tends to un-wind as it is transferred back to the rotor. Although this is an over simplification of the actual transfer, there is room for improvement.

The "Barrier Type" extruder, which provides an extended length barrier across the helical extrusion groove, accelerates the flow of the fluent phase process material while retarding the less fluent and oversize material. This is particularly effective on small size extruders, as the clearance barrier top to barrel bore can also be small. The "Barrier Type" extruder is widely used in plastic film extrusion. It is a means of providing equal processing to the process material.

All extruders tend to operate on the first in first out basis, similar to the flow of liquid through a pipe. This action limits extrusion blending, as practiced today, to cross-section blending of the process material. The present invention therefore provides two different means of longitudinal blending.

In present day mill room equipment, the internal mixer is provided with geometry which shears the baled polymer to size, introduces and incorporates powdered and liquid chemicals up to one half the weight of the polymer and discharges the resulting material as a non-uniform batch. (Occasionally loose black is part of the drop). To blend longitudinally the internal mixer is followed with the mills to complete the mix. Mills, the back bone of the rubber industry, in addition to other problems, are not an efficient mixer. The mill forms a band of process material on one roll. This band at the roll surface adheres to the roll and receives little shearing. The outer portion of the band is worked and elongated as it passes through the mill nip. The elongated material, returning to the mill nip must "push" its way in and thereby loosen the previously developed strain.

Mills equipped with an over-head blender can blend the batch to acceptable levels. However, equipment, power and a mill man are required. A minimum of two mill men in the area are required for safety purposes. In extrusion mixing as disclosed in U.S. Pat. No. 4,929,086, an apparatus (which replaces the 1,000 unit batch of the internal mixer with a 1,000 one unit batch) eliminates the need of post mixer mixing. Other examples of the prior art are the following U.S. Pat. Nos. 2,744,287 (Feb. 23,1954 ); 3,375,549 (April 1968); 3,888,469 (Jun. 10, 1975); 4,075,712 (Feb. 21, 1978); and 4,872,761 (Jul. 31, 1990).

Although many problems relative to the extrusion of plastic materials have been solved, temperature stratification by helical extruder grooves, longitudinal blending of the process material and mixing with minimum work input are continuing problems.

FEATURES OF THE INVENTION

It is therefore a feature of the present invention to provide an improved extrusion apparatus which uniformly and continuously processes the extrusion material through an imposed order of mixing to warm, blend and extrude the material to exact parameters.

Another feature of the present invention is to provide an improved extrusion apparatus which performs the warming, blending and extrusion of the process material with the work input approximately equal to the work required to warm the process material to the specified extrusion temperature.

Still another feature of the present invention is to provide an improved extrusion apparatus which minimizes the work input and thereby minimizes degradation of the polymer being processed.

A still further feature of the present invention is to provide an improved extrusion apparatus in which a large portion of the extrusion temperature development is by extruder geometry which does not generate temperature stratification of the process material.

Still another feature of the present invention is to provide an improved extrusion apparatus which cross shears the process material repeatedly to mix and blend the process material.

A still further feature of the present invention is to provide an improved extrusion apparatus which displaces the process material longitudinally in relation to itself to achieve longitudinal blending.

Yet another feature of the present invention is to provide an improved extrusion apparatus which includes means to adjust the capacity per turn and thereby control extrusion temperature.

Finally, another feature of the present invention is to provide an improved extrusion apparatus which costs less to buy, costs less to operate and produces product quality not available from present day extruders.

BRIEF DESCRIPTION OF THE DRAWINGS

FIG. 8 is an elevational view of the barrel member of the mixing stage of the apparatus, with parts broken away and in section;

FIG. 9 is a sectional view of the barrel member, taken on the line 9—9 of FIG. 8, and illustrating the location of the barrel extrusion grooves;

FIG. 10 is a cross-sectional view of the barrel extrusion grooves taken on the line 10—10 of FIG. 9;

FIG. 11 is an elevational view of another embodiment of the barrel member of the mixing stage of the apparatus, with deep pockets being provided in case dwell time is required;

FIG. 12 is an elevational view, partly in section, of another embodiment showing an enlarged diameter rotor which uses a "Pin Type" design to replace the extrusion grooves of FIGS. 4 and 5;

DESCRIPTION OF THE PREFERRED EMBODIMENT

Figure 1:
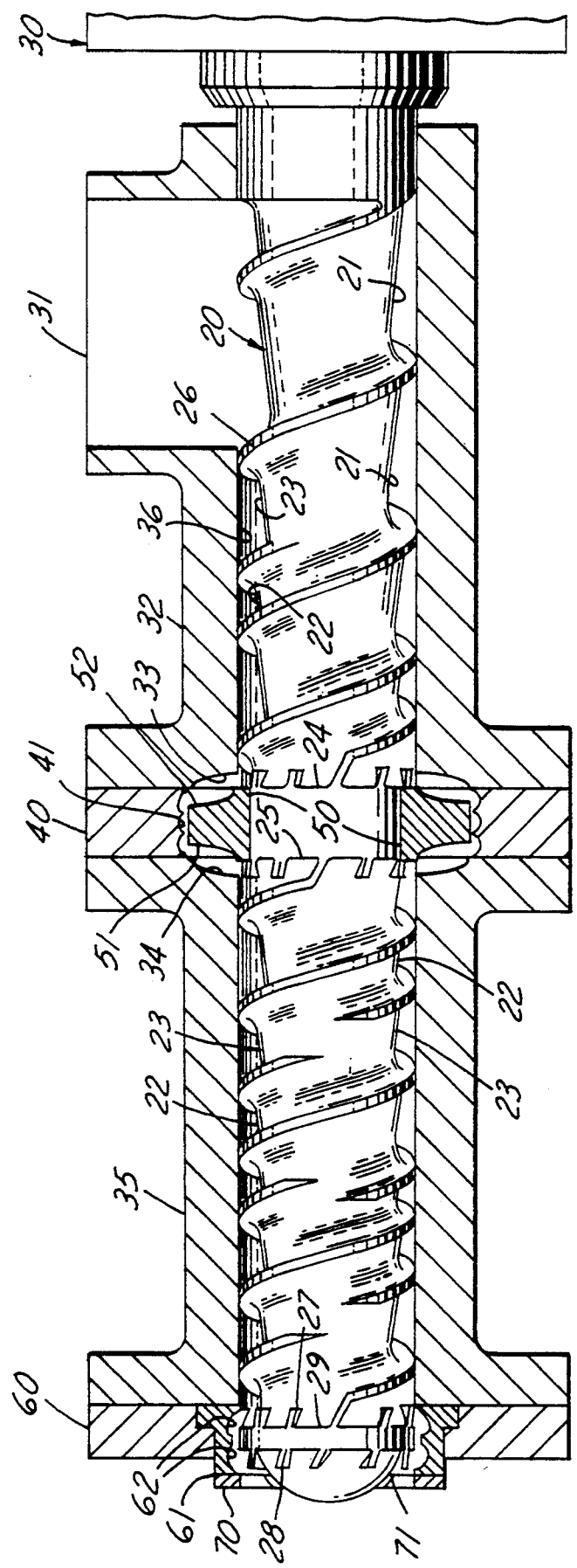
FIG. 1 is a longitudinal view of the extruder or extrusion apparatus, partly in section.
Figure 2:
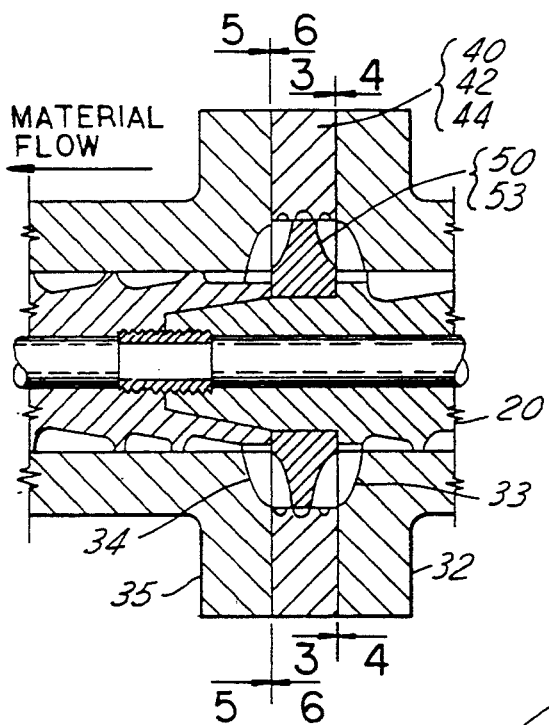
FIG. 2 is a cross-sectional view of the mixing stage which illustrates the member to member process material transfers and with the rotor member illustration section to accommodate experimental rotors.

As an introduction to the present invention there is provided a new and improved extrusion apparatus of the rotor and barrel type, having a feed means, a pressurizing and deaerating section, with a means of displacing the process material longitudinally in relation to itself, and a six member to member mixing stage. The mixing stage is followed by a metering section which is provided with a means of displacing the process material longitudinally in relation to itself and at the discharge end two member to member process material transfers.

The feed means consists of a feed hopper, provided with a helically grooved rotor arranged to feed the process material into the barrel member pressurizing section. The pressurizing section is short and due to the high viscosity of the entering processing material, temperature stratification is minimal. Deaeration is accomplished by the helical tooth tops co-acting with the smooth barrel bore to form a spiral passage for the entrained air to leak back to the hopper opening. To provide for longitudinal displacement of the process material, in relation to itself, multiple parallel downstream extending helical grooves, rotor, barrel or both, are provided with unequal rates of flow. The pressurizing section is followed by the mixing stage.

The mixing stage consists of six member to member transfers, rotor to barrel; barrel to enlarged rotor; enlarged rotor to enlarged barrel; enlarged barrel to enlarged rotor; enlarged rotor to down-stream barrel and down-stream barrel to down-stream rotor. Each member is provided with, as an example, ten short grooves arranged to send or receive the process material at each transfer. Thus, each sending groove transfers its process material to, as an example, ten receiving grooves at each revolution. Thus the division of process material through the mixing stage is the order of 1 to 10; 10 to 100; 100 to 1,000; 1,000 to 10,000; 10,000 to 100,000; and 100,000 to 1,000,000. To achieve the best mixing, the member to member transfer grooves are arranged to present the process material with its developed flow lines at right angles to the member to member circumferential shear of the transfer. This action tends to shear a point into a line, a line into an area and an area into a volume.

The process material leaving the mixing stage is pressurized and longitudinally blended by multiple start parallel down-stream extending helical grooves, rotor, barrel or both, which again have different flow rates to displace the process material longitudinally in relation to itself.

At the discharge end of the extruder there is provided a rotor to barrel to rotor process material transfer of a new and preferred design. The barrel member is provided with two side by side circumferential grooves. The up-stream circumferential groove receives the process material from the rotor with its flow lines in the circumferential direction. Rotation of the rotor deposits layer upon layer of process material until the groove is filled. Additional process material develops pressure which squeezes the process material end downstream and over the barrier separating the circumferential grooves. Again the action is to elongate the existing process material flow lines. Rotor action fills the trailing circumferential groove and at the same time transfers the excess process material from the barrel to the rotor to complete the cycle. Contrary to the Transfermix Extruder, all extrusion action extends existing flow lines and thereby non-productive shearing is eliminated. To visualize the longitudinal separation of the process material, the process material at the up-stream and bottom of the receiving circumferential groove, technically will never move.

Extrusion temperature control can be obtained by changing the dual circumferential groove barrel member, of the extruder end rotor to barrel to rotor transfer section. Barrel members with extrusion capacity adjusted to extrude the material being processed at the desired temperature would be installed when the process materials are changed. As the barrels are refined to the process material, run after run would extrude at the desired temperature. Extrusion temperature would then be a quality control check.

An adjustable range of extrusion temperatures can be obtained by dividing the dual circumferential barrel grooves and providing means to rotate one in relation to the other. The rotation would align and misalign co-acting openings and thereby regulate extrusion capacity.

Depending on the vane selection the rotor of the rotor to barrel to rotor of the process material transfer can leave the rotor in a circular pattern. This can be changed, if desired, by providing a post rotor stationary ring with vanes to redirect the process material.

Referring now to the drawings the extrusion apparatus of FIG. 1 is constructed in accordance with the preferred embodiment of the invention as applied to the continuous warming, mixing and extruding of process material. The process material is entered at the opening of the hopper 31 and is directed to the rotor 20. The rotor 20 is provided with helical extrusion grooves or groove 21 and is rotatably mounted in the bore 36 of the barrel. The rotor 20 is adapted for rotation by conventional power drive means 30. Rotation of the rotor 20 is effective to direct process material into the extrusion barrel bore 36. Rotor 20 is provided with a tooth top design 26 which acts in conjunction with barrel bore 36 to form a spiral passage for trapped air to return to the hopper opening.

The initial helical groove 21 in a smooth barrel is relatively short to avoid temperature stratification, but long enough to develop the extrusion pressure required for down-stream processing. The extrusion groove 21 is provided with a divider which creates extrusion grooves 22 and 23 which are un-equal in extrusion rates and thereby displace the process material longitudinally in relation to itself, to thereby generate some longitudinal blending of the process material. This extrusion section is followed by the mixing stage of six member to member transfers of rotor grooves 24 to barrel grooves 33, barrel grooves 33 to rotor grooves 52, rotor grooves 52 to barrel grooves 41, barrel grooves 41 to rotor 50, rotor 50 to barrel grooves 34 and barrel grooves 34 to rotor grooves 25 as shown in FIG. 1.

At the start of the mixing stage rotor 20 is provided with multiple rotor grooves 24 which divide the process material into, as an example, ten extrusion grooves which are arranged to align the flow lines of the process material in the radial direction so as to be cross-sheared at the transfer to barrel grooves 33. The barrel grooves 33 extend in the radial direction and communicate with co-acting rotor grooves 52 of enlarged diameter rotor 50. The rotor grooves 52 communicate with enlarged barrel grooves 41. The rotor enlarged barrel grooves 41 are arranged to turn the process material back into the enlarged rotor via the rotor grooves 51. The radially extending enlarged rotor grooves 51 communicate with radial barrel grooves 34. The barrel grooves 34 communicate with rotor grooves 25 to complete the mixing stage. The increased diameter of the rotor 50 adds four right angle turns to the process material as it passes through the mixing stage. These turns add additional cross-shearing of the process material as it passes through the mixing stage. The mixing stage is followed by two start helical extrusion grooves which have different rates of longitudinal flow to make longitudinal blending possible. The longitudinal helical grooves terminate at a rotor to barrel to rotor process material transfer zone.

Figure 16:
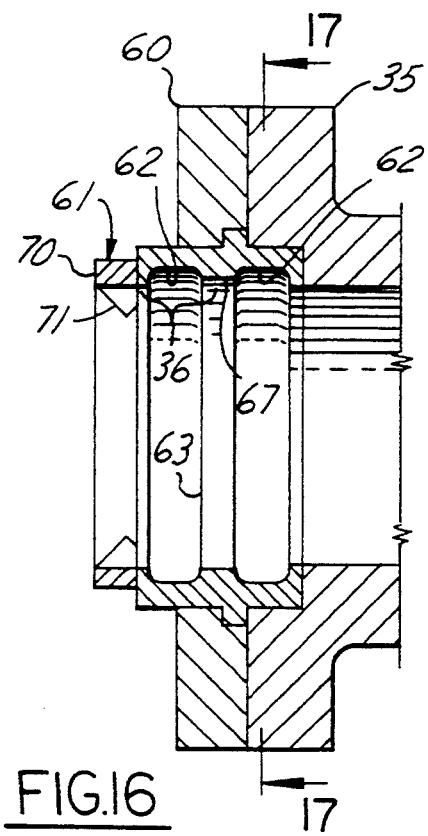
FIG. 16 is an elevational sectional view of the barrel member of the rotor to barrel to rotor zone of the apparatus, showing the circumferential barrel grooves with a groove separating barrier.

This process material transfer is of a new and novel design. Rotor 20 transfers process material from its multiple grooves 27 to the co-acting circumferential groove 62. The extruder action is to wind the process material, layer upon layer, extending its established flow lines as it fills and over-fills co-acting groove 62. Build up of process material generates pressure which moves the layered process material end down-stream to circumferential barrier 63 as shown in FIG. 16. The circumferential barrier 63 can be used to perform dual objectives. First, it can be used to provide the rate of longitudinal blending by providing openings which favor the passage of process material from the inner or outer portions of groove 62. Second, the area of the openings can be restrictive to extrusion flow and to thereby control the extrusion temperature. Control of extrusion temperature makes adiabatic extrusion possible. Adiabatic extrusion uses the process material as the only coolant, so that the extrusion temperature is constant throughout the speed range of the extruder.

The extruder action at the barrier 63 again extends the established flow lines of the process material. The process material passing the barrier 63 of FIG. 16 enters the trailing circumferential groove 62, which when filled, transfers the process material to multiple rotor grooves 28. Again, the extruder action tends to extend the established flow lines of the process material. The barrel member 61 of FIG. 16 of the rotor to barrel to rotor transfer is easily changeable so that substitution of other barrel members, with adjusted extrusion capacity, for barrel member 61 can be made to control extrusion temperature.

Figure 20:
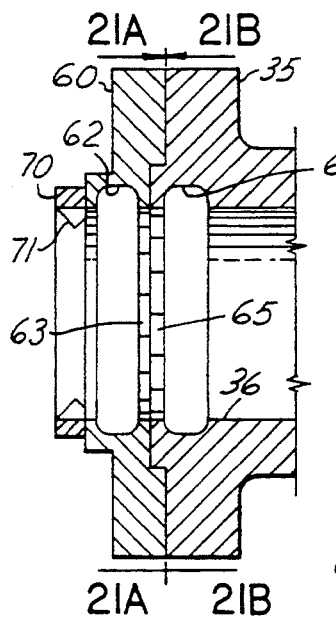
FIG. 20 is a sectional view of another embodiment of the barrel member of the rotor to barrel to rotor zone of the apparatus, illustrating an alternate design of the barrier of FIG. 16.
Figure 22A:
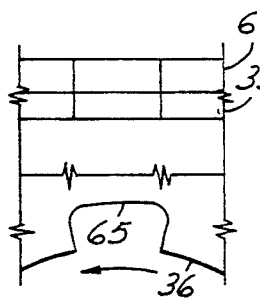
FIG. 22A is a plan and elevational view of a typical opening, with the opening cut at right angles to the barrier.
Figure 22B:
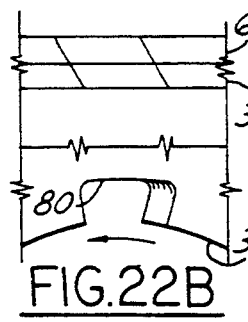
FIG. 22B is similar to the opening of FIG. 22A except that it is cut at an angle to conform to extrusion flow.

Also barriers as shown in FIGS. 22A through 22F have adjustable extrusion capacity, by means of adjusting the area of their openings 65 by rotating barrel member 60 of FIG. 16 in relation to barrel section 35 of FIG. 20. FIG. 22A is provided with multiple rectangular openings 65, at the barrel bore 36. The openings 65 are cut at right angles to the barrier displacement of the material. Thus, it is designed to favor process material flow from the deep portion of the co-acting groove 62 to thereby tend to equalize the rate of flow through the barrier. The openings 65 are designed to transfer the process material as accumulated in up-stream groove 62 to down-stream groove 62. Again at transfer, the established flow lines of the process material are extended. Process material flow, the depth of co-acting groove is accommodated. FIG. 22B is similar to FIG. 22A except that the openings 80 are at an angle to assist and to conform to the flow of the process material.

Figure 22C:
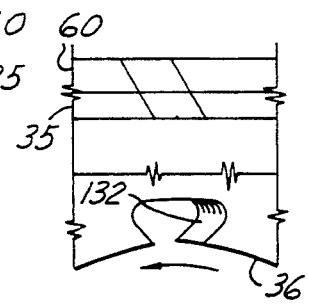
FIG. 22C is a plan and elevational view of another opening which is narrow at the barrel bore and increases in width as the depth increases.

FIG. 22C is provided with multiple openings 82, narrow at the barrel bore 36 and increase in width as the depth increases. This design favors the transfer of the process material remote from the barrel bore and thereby provides longitudinal movement.

Figure 22D:
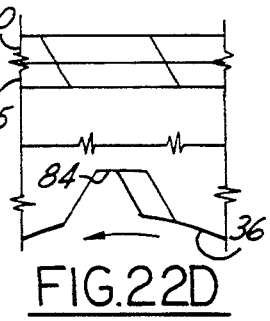
FIG. 22D is a plan and elevational view of still another opening which is wide at the barrel bore and decreases in width as the depth increases.

FIG. 22D is provided with multiple openings 84 which are wide at the barrel bore 36 and decrease in width as the depth increases. This design favors the transfer of the process material at the barrel bore 36 while retarding flow at the deep portion of co-acting groove 62. The feature of this design is to again displace the process material longitudinally in relation to itself.

Figure 22E:
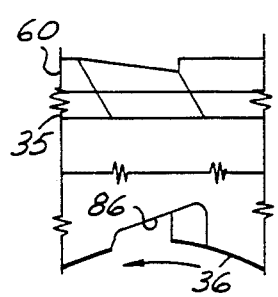
FIG. 22E is a plan and elevational view of another opening which is tapered in depth, deep at the leading edge and shallow at the trailing edge.

FIG. 22E provides multiple openings 86 with a tapered indepth, deep at the leading end and shallow at the trailing end. This design tends to turn the process material down-stream at near right angles as it enters the trailing circumferential groove 62. Again the extruder action is to extend the established process material flow lines in the circumferential direction.

Figure 22F:
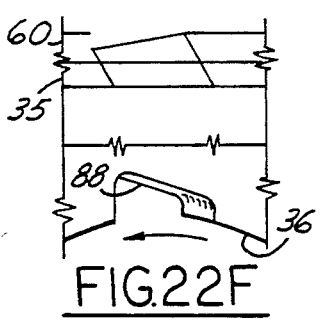
FIG. 22F is a plan and elevational view of a further opening 22G similar to the opening of FIG. 22E except that it is designed to turn the process material up-stream against the circumferential flow in a co-acting groove.

FIG. 22F is another opening similar to the openings of FIG. 22E except that the multiple openings 88 are shallow at the leading edge and wide at the trailing edge. As the transferred process material is now directed up-stream against the circumferential flow in co-acting groove 62, considerable turbulence can be developed which may or may not contribute to the imposed order of mixing.

Figure 3:
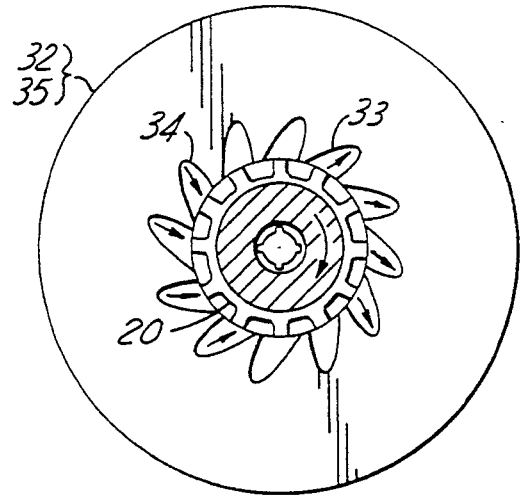
FIG. 3 is an end elevational view of the end flange of the barrel section of the apparatus taken in the direction of the corresponding arrows 3—3 of FIG. 2.
Figure 6:
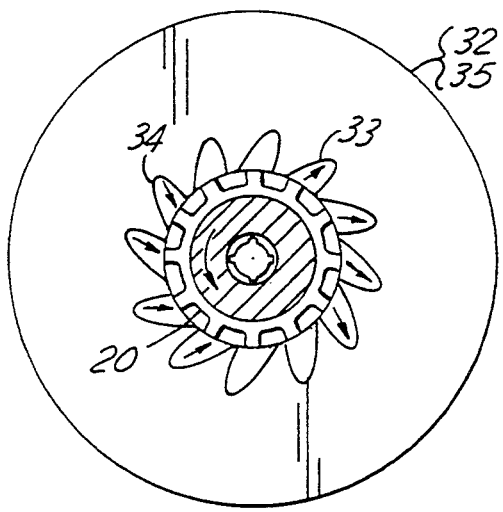
FIG. 6 is an end elevational view of the end flange of the barrel section of the apparatus taken in the direction of the corresponding arrows 6—6 of FIG. 2.

FIG. 3 and FIG. 6 show the end elevational view of the end flange of barrel sections 32 and 35. The design is shown as identical, but it should be recognized that outward radial flow, due to increasing shear rate, meets more resistance.

Figure 5:
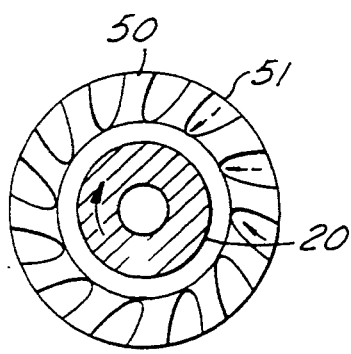
FIG. 5 is an up-stream elevational view of rotor member of the mixing stage of the apparatus, taken in the direction of arrows 5—5 of FIG. 2.
Figure 7:
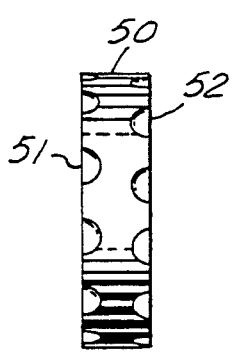
FIG. 7 is an elevational view of the rotor member of the mixing stage of the apparatus.

In FIGS. 5 and 7 the rotor 50 of the mixing stage is provided with rotor grooves 52 which can be adjusted to achieve the required extrusion capacity.

The rotor 50 of the mixing stage as shown in FIG. 5 and 7 has its grooves 51 which are assisted in moving the process material radially inward by the decreasing shear rate.

The barrel member 40 of the mixing stage is shown FIGS. 8-10 inclusive and the cut-away and sections show views of the barrel grooves 41.

The alternate design of the barrel member 42 of the mixing stage is shown in FIG. 11 and is provided with deep pockets 43 in case dwell time is required.

Figure 4:
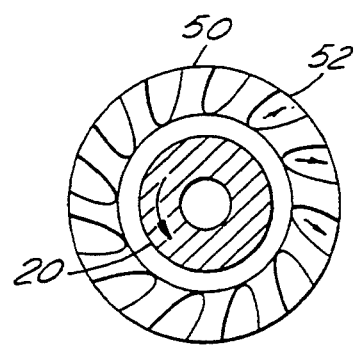
FIG. 4 is a downstream elevational view of the rotor member of the mixing stage of the apparatus, taken in the direction of arrows 4—4 of FIG. 2.

In FIG. 12 an alternate design of the enlarged diameter rotor 54, is shown which uses a "Pin Type" design having a plurality of circumferentially-spaced, radially-spaced pins 53 which replaces the grooves 51 and 52 of FIGS. 4 and 5. The rotor 54 is located within the bore 45 of the barrel member 44.

Figure 15:
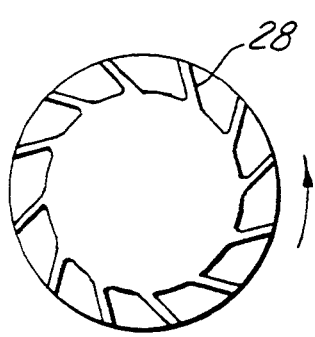
FIG. 15 is an end view of the rotor of FIG. 13 and showing the multiple receiving grooves.
Figure 13:
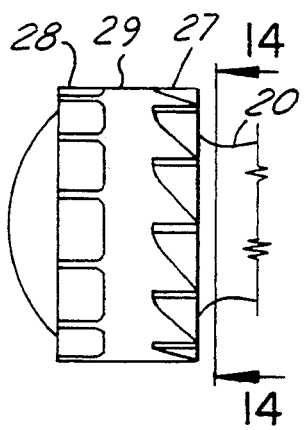
FIG. 13 is an elevational view of the rotor of the rotor to barrel to rotor zone of the apparatus illustrating multiple sending grooves, a circumferential barrier and rotor receiving grooves.
Figure 14:
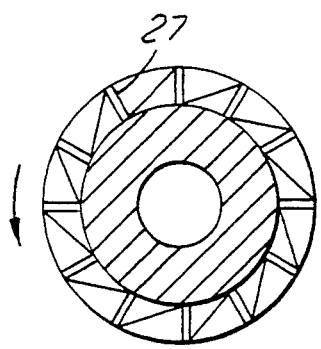
FIG. 14 is an elevational sectional view of the rotor showing the multiple sending grooves and taken on the line 14—14 of FIG. 13.

FIGS. 13 and 14 illustrate the rotor 20 of the rotor to barrel to rotor zone showing the multiple sending grooves 27, the circumferential barrier 29 and the rotor receiving grooves 28. The multiple receiving grooves 28 of rotor 20 are illustrated in FIG. 15.

Figure 17:
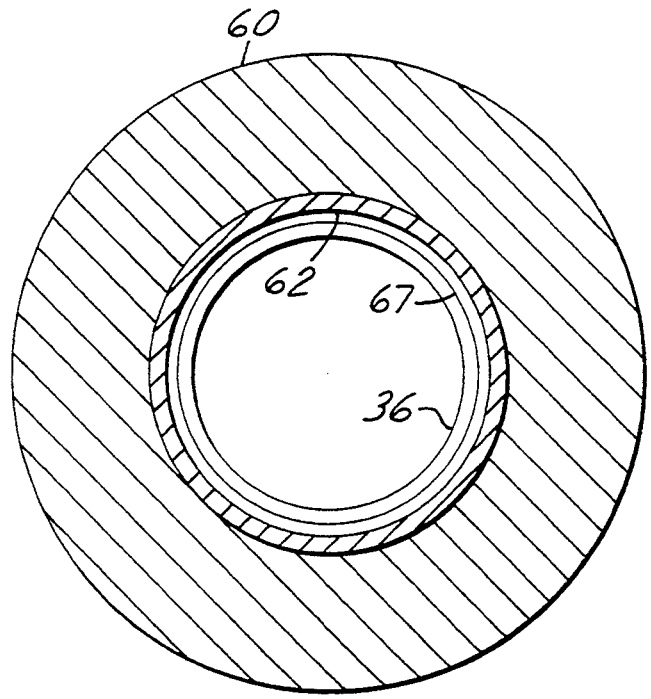
FIG. 17 is a sectional view taken on the line 17—17 of FIG. 16.

The barrel member 61 of the rotor to barrel to rotor zone, as shown in FIGS. 16 and 17, illustrates the circumferential barrel grooves 62 with groove separating barrier 63. The clearance between circumferential barrier 29 and barrel groove 62 dividing barrier 63 from a circumferential opening 67 which is used to restrict extrusion flow and thereby extrusion temperature. The barrel member 61 is replaceable with the area of opening 67 adjusted in area to provide an extrusion capacity which extrudes the process material at the specified temperature.

Figure 18:
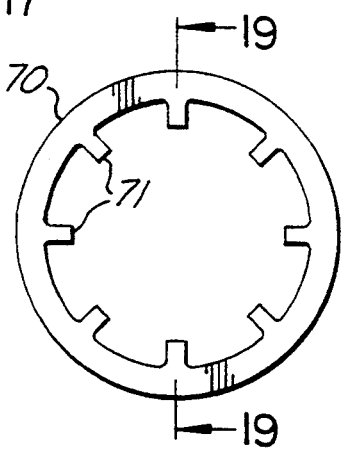
FIG. 18 is an end view of the process material flow redirectional ring.
Figure 19:
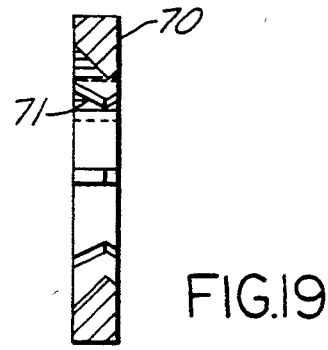
FIG. 19 is a cross-sectional view of the redirectional ring taken on the line 19—19 of FIG. 18.

The process material flow redirectional ring 70 of FIGS. 18 and 19, located within barrel member 60 of the discharge stage, is provided with grooves 71 which arrest the circumferential flow of the process material leaving multiple rotor grooves 28.

Figure 21A:
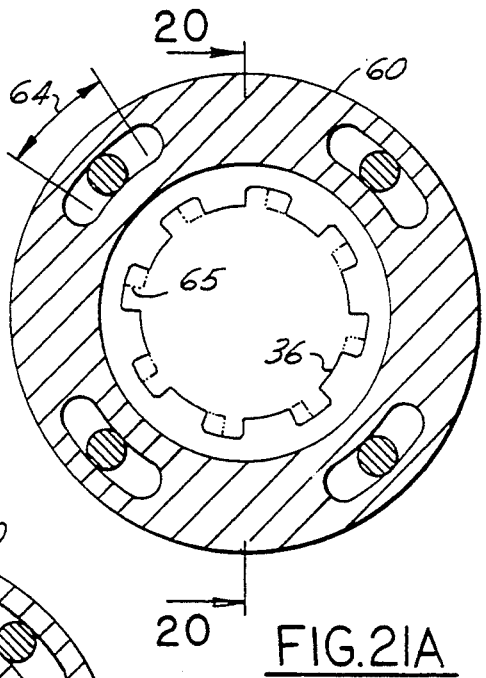
FIG. 21A is a sectional view of the apparatus at the part line of the barrier, taken on the lines 21A—21A.
Figure 21B:
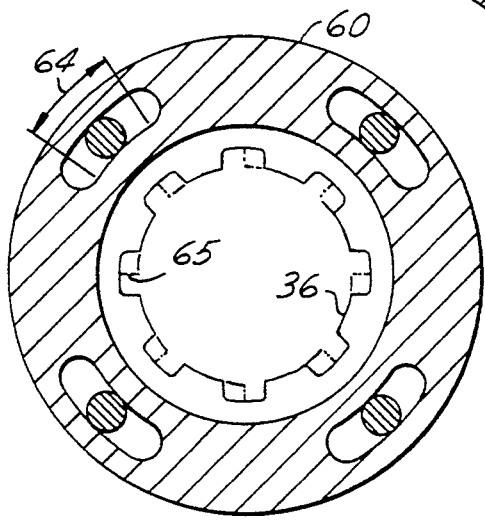
FIG. 21B is a sectional view of the apparatus at the part line of the barrier taken on the lines 21B—21B.

In FIG. 20 the barrel member of the rotor to barrel to rotor zone illustrates an alternate design of the barrier 63 of FIG. 16. The barrier 63 is fitted with numerous openings 65, communicating with the barrel bore 36, and is divided into two parts each with opening 65 and one of the parts being integral with the barrel section 35 and the other being integral with the barrel member 60, so that rotation of one part to the other adjusts the open area communicating between the circumferential grooves 62. FIGS. 21A & 21B illustrate the extruder at the part line of barrier 63. It shows the range of rotational adjustment 64 and the multiple openings 65.

OPERATION

The apparatus or extruder of this application is provided for the mixing and extruding of thermo-plastic and rubber like process materials, in which a rotor member is rotatable within the bore of a barrel member. Interposed between the feed end and the discharge end of the apparatus, the members are provided with one or more mixing stages, consisting of process material transfers, rotor to barrel, barrel to enlarged rotor, enlarged rotor to enlarged barrel, enlarged barrel to enlarged rotor, enlarged rotor to barrel and barrel to rotor. Each process material transfer has the sending member provided with multiple grooves, as an example, ten which communicate with co-acting receiving member multiple grooves of the same number. Each revolution of the rotor transfers process material from each sending groove to all of the co-acting receiving grooves. Such action reduces the thickness of the transferred material in the ratio of one to ten. As there are six process material transfers, the resulting division of process material can be in the order of 1 to 10; 10 to 100; 100 to 1,000; 1,000 to 10,000 and 10,000 to 100,000 and 100,000 to 1,000,000.

The geometry of the sending and receiving grooves orients the flow lines of the process material at right angles to the circumferential shear generated by rotation between the members. Thus the classic mixing action, shearing a point to a line, a line to an area and an area to a volume is provided. The mixing stage achieves cross-blending of the process material and little longitudinal blending as extrusion flow is similar to flow through a pipe. To achieve longitudinal blending, the forcing and transporting sections of the extruder are provided with multiple start rotor, barrel or both helical grooves, which have different rates of down-stream flow, so as to displace the process material longitudinally in relation to itself and to thereby provide a measured and repeatable amount of longitudinal displacement.

The discharge end of the extruder is provided with a new type of extrusion which eliminates the strain releasing action, of the typical helical extrusion groove, as the process material is submerged and "pushes" it way back to the leading edge of the helical groove. The rotor is provided with a short circumferential rotor to barrel transfer section, the rotor of which is fitted with multiple vanes, arranged to divert the extrusion flow to the co-acting barrel. The co-acting barrel is provided with a circumferential groove into which the rotor action winds the process material, layer upon layer. When the barrel circumferential groove is filled, additional layers generate pressure which spreads the circumferentially wound process material and thereby moves the trailing edge down-stream. This action increases the established circumferential strain of the process material.

The down-stream continuation of the barrel receiving groove becomes the barrel circumferential sending groove. It and its co-acting rotor member can be plain or fitted with vanes. As the object of the extrusion demands but in any case, the established circumferential strain lines of the process material will be increased. The barrel groove, between the receiving and sending sections can be fitted with a barrier, the height of which can regulate extrusion flow and thereby can regulate extrusion temperature.

What is claimed is:

1. An apparatus having a hopper with an opening for the warming, mixing and extrusion of thermo-plastic and rubber like materials encompassed in air which comprises:

an elongated generally cylindrical barrel member having a barrel bore and an elongated rotor member disposed coaxially in the interior of said barrel member;

means provided for relative rotational movement between said rotor and barrel members in the treating and axial advancing of the material to be processed along said members;

said rotor and barrel members having a feed end and a discharge end, a pressurizing section, a mixing stage and an end extrusion section interposed between said feed and discharge ends;

said pressurizing section being provided with at least one helical groove on the rotor to provide a means of displacing the process material longitudinally in relation to said mixing stage;

said at least one helical groove having a wide tooth top which when co-acting with said barrel bore provides a spiral path for the encompassed air to leak back to the hopper opening;

said mixing stage having six member to member process material transfers including;

a first transfer, from said rotor member to said barrel member wherein said rotor member has multiple down-stream extending grooves co-acting with multiple outward extending barrel grooves of said barrel member which pass said process material through a shear area generated between said rotor and barrel members and into said outward extending barrel grooves;

a second transfer, from said barrel member to the up-stream side of an enlarged section of said rotor member, which provides said barrel member with said multiple outward extending barrel grooves which taper to zero capacity and which pass said process material through a shear area generated between said members and into co-acting multiple outward extending rotor grooves of said enlarged rotor member;

a third transfer, from said enlarged rotor member to an enlarged section of said barrel member, which provides said enlarged rotor member with said multiple outward extending rotor grooves tapering to maximum capacity and which pass said process material through a shear area generated between said members and into multiple down-stream extending barrel grooves of said enlarged barrel member;

a fourth transfer, from said enlarged barrel member to the down-stream side of said enlarged rotor member, which provides said enlarged barrel member with said multiple down-stream extending barrel grooves which pass said process material to and through a shear area generated between said members and to co-acting multiple inward extending rotor grooves of a trailing side of said enlarged rotor member;

a fifth transfer, from said trailing side of said enlarged rotor member to an adjacent section of said barrel member, which provides said trailing side of the enlarged rotor member with said multiple inward extending rotor grooves which taper to zero capacity and which pass said process material to co-acting multiple inward extending barrel grooves of said adjacent section of said barrel member; and a sixth transfer, from said multiple inward extending barrel grooves to said rotor, said multiple inward extending barrel grooves increasing to maximum in extrusion capacity and passing said process material to and through a shear area generated between said members to multiple receiving grooves provided in said rotor; and said mixing stage being following by said end extrusion section wherein said rotor member is provided with a helical groove to generate the required extrusion pressure.

2. An apparatus as in claim 1, in which said barrel located in said mixing stage is provided with deep pockets replacing at least one of said multiple outward extending and downstream extending and inward extending barrel grooves so as to store process material to thereby provide dwell time to equalize temperature difference.

3. An apparatus in claim 1, in which more than one mixing stage is interposed between the feed and discharge ends.

4. An apparatus as in claim 1, wherein said enlarged rotor section is provided with multiple pins defining said multiple outward extending rotor grooves.

5. An apparatus as in claim 1, further comprising a mechanical throttling means at said discharge end for restricting movement of process material therepast to increase extrusion temperature.

6. An apparatus as in claim 1, in which the helical groove of the end extrusion section is divided to form two helical extrusion grooves with unequal rates of down-stream flow so as to displace the process material longitudinally in relation to itself.

7. An apparatus as in claim 1, in which the discharge end is provided with a rotor to barrel to rotor process material transfer, comprising said rotor member having multiple short grooves which co-act with a first circumferential barrel groove of said barrel member, a changeable circumferential restrictive barrier defining a plurality of generally longitudinal openings of selectively changeable area opening on a first side to said first circumferential barrel groove and opening on a second side to a second circumferential barrel groove for transferring process material therebetween and said second circumferential barrel groove of said barrel member which co-acts with multiple rotor grooves of said rotor member to complete the transfer.

8. An apparatus as in claim 7, in which said barrel of said discharge end is provided with a process material flow reorienting ring which changes the circumferential flow to predominately longitudinal extending flow.

* * * * *